US012345090B2

(12) United States Patent
Brändle et al.

(10) Patent No.: US 12,345,090 B2
(45) Date of Patent: Jul. 1, 2025

(54) SEAL DEVICE

(71) Applicant: ASSA ABLOY (Schweiz) AG, Richterswil (CH)

(72) Inventors: Andreas Brändle, Winterthur (CH); Fabian Zala, Dietlikon (CH)

(73) Assignee: ASSA ABLOY (Schweiz) AG, Richterswil (CH)

( * ) Notice: Subject to any disclaimer, the term of this patent is extended or adjusted under 35 U.S.C. 154(b) by 0 days.

(21) Appl. No.: 18/532,614

(22) Filed: Dec. 7, 2023

(65) Prior Publication Data

US 2024/0191563 A1 Jun. 13, 2024

(30) Foreign Application Priority Data

Dec. 8, 2022 (EP) .................................... 22212164

(51) Int. Cl.
*E06B 7/21* (2006.01)
*E06B 7/215* (2006.01)
*E06B 7/20* (2006.01)

(52) U.S. Cl.
CPC ................ *E06B 7/21* (2013.01); *E06B 7/215* (2013.01); *E06B 2007/202* (2013.01)

(58) Field of Classification Search
CPC ........................................................ E06B 7/21
See application file for complete search history.

(56) References Cited

U.S. PATENT DOCUMENTS 167,820 A * 9/1875 Bennett ..................... E06B 7/20 49/306
803,026 A * 10/1905 Stubbs ...................... E06B 7/20 49/308
2,035,723 A * 3/1936 Robinson .................. E06B 7/20 49/307
2,041,261 A * 5/1936 Muse ........................ E06B 7/20 49/309
3,250,314 A * 5/1966 Wetzel ...................... E06B 7/20 160/40
3,871,133 A * 3/1975 Ellingson, Jr. ........ E06B 7/2316 49/470

(Continued)

FOREIGN PATENT DOCUMENTS

DE 851411 10/1952
DE 20219081 U1 3/2003

(Continued)

*Primary Examiner* — Catherine A Kelly
(74) *Attorney, Agent, or Firm* — The Webb Law Firm

(57) ABSTRACT

A seal device for a door with a pivotable door leaf includes a drop-down seal for arrangement on or in the door leaf. The drop-down seal has a housing profile rail, a sealing strip which can be raised and lowered relative to the housing profile rail, a lowering mechanism for raising and lowering the sealing strip, and an actuating part, wherein the actuating part actuates the lowering mechanism when the door leaf is being closed. The seal device includes a triggering module with a wheel, wherein the triggering module acts on the actuating part when the door leaf is being closed. The triggering module is designed for arrangement on or in the door leaf and/or is arranged fixedly on the housing profile rail. This seal device is suitable in particular for pivot doors.

13 Claims, 7 Drawing Sheets

(56) References Cited

U.S. PATENT DOCUMENTS

| | | | | |
|---|---|---|---|---|
| 6,195,939 | B1 * | 3/2001 | Sowers | E06B 7/21<br>49/307 |
| 8,925,250 | B2 * | 1/2015 | Parker | E06B 7/21<br>49/306 |
| 10,024,100 | B2 * | 7/2018 | Meng | E06B 7/21 |
| 11,352,832 | B2 * | 6/2022 | Paik | E06B 3/36 |
| 2018/0291674 | A1 * | 10/2018 | Dintheer | E06B 7/18 |
| 2024/0191562 | A1 * | 6/2024 | Brändle | E06B 7/2316 |

FOREIGN PATENT DOCUMENTS

| | | | |
|---|---|---|---|
| DE | 102016108385 | A1 | 11/2017 |
| EP | 3667010 | A1 | 6/2020 |
| GB | 101852 | | 10/1916 |
| JP | S6122888 | U | 2/1986 |
| KR | 1020130049928 | A | 5/2013 |

* cited by examiner

SEAL DEVICE

CROSS REFERENCE TO RELATED APPLICATION

This application claims priority to European Patent Application No. 22 212 164.2, filed Dec. 8, 2022, the disclosure of which is hereby incorporated by reference in its entirety.

BACKGROUND OF THE INVENTION

Field of the Invention

The present invention relates to a seal device for a door and to a triggering module for such a seal device.

Description of Related Art

Door seals are usually used in areas where the ingress of light is to be prevented and/or sound insulation is to be ensured. Door gap seals in the form of drop-down seals usually comprise a housing rail in the form of a U-shaped profile rail, a sealing strip, which is held on or in this housing rail, can be displaced relative thereto and has a sealing element, and a lowering mechanism for lowering and raising the sealing strip. The sealing strip usually drops automatically when the door is being closed, in that a force in the longitudinal direction acts on an actuating part protruding beyond the housing rail and actuates the mechanical lowering mechanism counter to a spring force. The actuating part is usually a rod or a bolt. When the door leaf is being opened, the bolt is rereleased and the lowering mechanism raises the sealing strip again by virtue of the restoring force of the springs. Such drop-down seals can be used not only on a door underside but also laterally in relation to or on the top side of the door. The lowering and raising is therefore to be understood in relation to the housing rail.

When pivotable door leaves are being closed, the triggering bolt abuts the fixed door frame and is pressed in as the door leaf continues to be closed. In the case of pivotable doors, also referred to as pivot doors, the vertical pivot axis of the door leaf is located inside the door leaf and not, as is the case for other pivotable door leaves, in the door hinge between the door frame and the door leaf. When the pivot-door leaf is being closed, other forces act on the triggering bolt. The closing behaviour is therefore different. The wear on the triggering bolt and on the door frame is therefore more considerable.

DE 102016108385 A1 discloses a mechanically actuatable drop-down seal for a pivot door. The drop-down seal has a housing and a trigger which protrudes beyond the end face of the housing and has a rotatably mounted rotation element for bearing against a fixed stop surface. The rotation element is a ball bearing or roller bearing with an axis of rotation extending perpendicularly in relation to the longitudinal direction of the drop-down seal. The rotation element forms the free end of the rod-shaped trigger. A fixed stop surface, which forms a run-up ramp with a peak, is present on the fixed case.

EP 3 667 010 A1 describes a stop device for a pivot door, wherein the stop device has a roller which is held rotatably in a roller carrier. The stop device is fastened to the fixed case of the door.

Furthermore, DE 202 19 081 U1 discloses a sliding door comprising a drop-down seal with a housing and a trigger, which is arranged pivotably in the housing and is intended for actuating a mechanism for lowering a sealing strip. The trigger is in the form of a lever element which has a roller for making contact with the fixed door frame.

KR 20130049928 A also describes a drop-down seal with a triggering lever and a roller arranged thereon.

The known solutions have the disadvantage that they require a relatively large amount of space and thus are virtually impossible to use for a narrow vertical door gap, as often arises in the case of pivot doors. Moreover, at least for some of the proposed solutions specially shaped run-up ramps are required. It is also virtually impossible to adapt them to the local conditions, in particular to the respective dimensions of the gap.

SUMMARY OF THE INVENTION

It is therefore an object of the invention to provide an improved seal device for a door, which can be used for pivot doors.

The seal device according to the invention for a door with a pivotable door leaf comprises a drop-down seal, which is designed for arrangement in a pivotable door leaf of a door. The drop-down seal has a housing profile rail, a sealing strip which can be raised and lowered relative to the housing profile rail, a lowering mechanism for raising and lowering the sealing strip, and an actuating part. The actuating part actuates the lowering mechanism when the door leaf is being closed. The seal device comprises a triggering module with a wheel, wherein the triggering module acts on the actuating part when the door leaf is being closed. The triggering module is designed for arrangement on or in the door leaf and/or is arranged fixedly on the housing profile rail. It has a pivot arm, which at a first end is operatively connected to the actuating part and at a second end is designed for fastening on or in the door leaf. The wheel is arranged in or on the pivot arm and is designed to bear against a fixed stop surface of the door and/or is arranged fixedly on the housing profile rail.

The term "wheel" in this text also includes rollers and the like.

This seal device can be used for all door types, but in particular for unrebated doors and for pivot doors. It can be used not only on a door underside, but also laterally in relation to or on the top side of the door. The lowering and raising is therefore to be understood in relation to the housing rail.

It is advantageous for the triggering module to be integrated in the door leaf and to protrude only minimally beyond the door leaf, and for the device to also be usable for narrow door gaps.

The triggering module can be used in combination with known drop-down seals by virtue of the pivot arm. It is therefore not necessary to redesign a drop-down seal.

The action of force on the drop-down seal is optimized while at the same time abrasive wear on the door frame is reduced and abrasive wear on the actuating part is avoided.

By virtue of the use of a pivot arm, it is moreover possible to adapt the triggering module easily to the local conditions.

The operative connection of the pivot arm to the actuating part can be achieved by further components arranged in between. Preferably, however, the first end of the pivot arm makes contact with the actuating part. Depending on the embodiment, the contact is made only when the door leaf is being closed. In preferred embodiments, however, the first end of the pivot arm is detachably connected to the actuating part, preferably even when the door is open or partially closed.

Depending on the type of the drop-down seal, the actuating part is designed differently, in particular it is designed according to the actuating parts known in the prior art. Preferably, it is arranged on the end face of the sealing strip and thus of the drop-down seal. In preferred embodiments, the actuating part is a rod or a bolt, which extends in the longitudinal direction of the sealing strip and preferably projects beyond its end face.

In some embodiments, the triggering module is arranged above or in front of the end face of the sealing strip. In preferred embodiments, however, it is arranged laterally in relation to the sealing strip. In the lateral arrangement, it protrudes beyond the sealing strip preferably partially in the longitudinal direction of the sealing strip.

Preferably, the position of an axis of rotation of the wheel relative to the second end of the pivot arm can be adjusted. The wheel thus makes contact, depending on its positioning, with the door frame in another pivoting position of the pivot arm. This makes it possible to adapt the triggering module to the width of the respective door gap.

Preferably, the wheel is arranged interchangeably in the pivot arm. This makes it possible to use the triggering module with wheels of different diameters in some embodiments. This likewise enables adaptation to the size of the respective door gap. As an alternative or in addition, the wheel can be fastened in the pivot arm in different positions. This enables very easy and quick adaptation to the respective size of the door gap without additional parts being necessary.

Preferably, the length of the pivot arm can be adjusted in the region of the first end. This enables adaptation to the actuating part of the drop-down seal.

As an alternative or in addition, the position of the actuating part with respect to the drop-down mechanism can be adjusted. This enables adaptation of the travel of the sealing strip to the local conditions and to the size of the door gap.

In preferred embodiments, the pivot arm is pivotable about a pivot axis and the wheel is rotatable about an axis of rotation, wherein the pivot axis and the axis of rotation extend parallel to, but spaced apart from, one another. The pivot arm thus pivots in the same spatial direction in which the wheel also rolls on the door frame. The forces are optimized.

Preferably, the pivot axis and the axis of rotation extend perpendicularly in relation to the longitudinal direction of the sealing strip and parallel to the direction in which the sealing strip is lowered. This makes it possible to arrange the triggering module in a recess in the door leaf that extends only in a bottom or top edge region of the door leaf.

Preferably, the pivot axis and the axis of rotation are on the same side of the sealing strip. The triggering module can thus be designed and arranged irrespective of the type of the drop-down seal. It is possible to use differently designed drop-down seals with triggering modules of the same shape.

In some embodiments, at least in the lowered state, the sealing strip or at least the sealing profile formed by the sealing strip protrudes beyond the door leaf slightly, in order to seal the end-side gap between the door leaf and the door frame. In other embodiments, an adapter part which can be connected to the sealing strip to extend the sealing strip is present. Preferably, the sealing profile of the sealing strip is designed such that it can be extended, in particular kneaded out, along a carrier profile rail of the sealing strip and thus can also extend over the adapter part. In other embodiments, the adapter part has its own sealing profile, which adjoins the sealing profile of the sealing strip.

Depending on the embodiment, the pivot arm can be fastened on or in the door leaf in different ways. In preferred embodiments, the pivot arm is pivotably fastened to a fixing part, wherein the fixing part can be positionally fixedly fastened on or in the door leaf. In some embodiments, the fixing part is an elongate component. In other embodiments, it is an angled element with an arm that preferably extends behind the pivot arm. These angled embodiments are extremely space-saving and suitable for narrow door leaves. In further embodiments, the fixing part is essentially plate-shaped.

In other embodiments, the pivot arm is fastened on or in the door leaf only by means of its pivot axis.

In some embodiments, the drop-down seal with the sealing strip is fastened on or in the door leaf separately by its own fastening means. Such fastening means are well known in the prior art. They are, for example, fastening brackets arranged on the end face. In other embodiments, fins or grooves which can be inserted into matching mating pieces of the door leaf are integrally formed on a housing of the drop-down seal. This is the case in particular for metal doors.

In other embodiments, the drop-down seal can be mounted on or in the door leaf together with the triggering module. This shortens the mounting time. In some of these embodiments, for this the seal device has a fixing part, which has a tab for fixing the housing rail on the door leaf. This makes the mounting easier.

A door leaf according to the invention having a seal device according to the invention that is described here has an end-side recess, in which the triggering module is arranged.

BRIEF DESCRIPTION OF THE DRAWINGS

The terms Fig., Figs., Figure, and Figures are used interchangeably in the specification to refer to the corresponding figures in the drawings.

Preferred embodiments of the invention are described below on the basis of the drawings, which serve merely for elucidation and are not to be interpreted as limiting. In the drawings.

DESCRIPTION OF THE INVENTION

Figure 1:
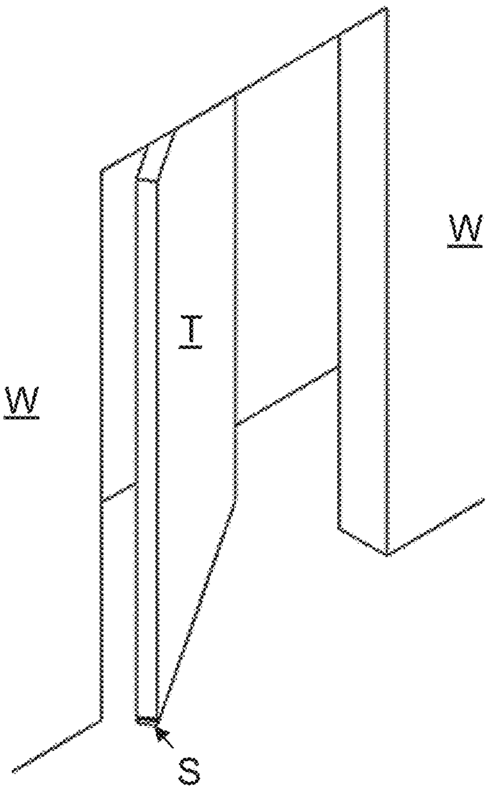
FIG. 1 shows a perspective illustration of a pivot door having a seal device according to the invention.

FIG. 1 shows a building situation with a wall W, in which a pivot door with a pivotable door leaf T is formed. As can be seen in FIG. 1, the door pivot axis D is located in the door surface. A groove for receiving a seal device S is formed in the bottom end face of the door leaf T. In other embodiments, a groove and a seal device S arranged therein are alternatively or additionally present on the top end face and/or the lateral end faces of the door leaf T. Instead of arrangement in a groove, the seal device S can also be fastened on the door leaf T.

Depending on the embodiment, the wall W itself forms the frame for the door leaf, or a case arranged in the wall opening is present.

Figure 12:
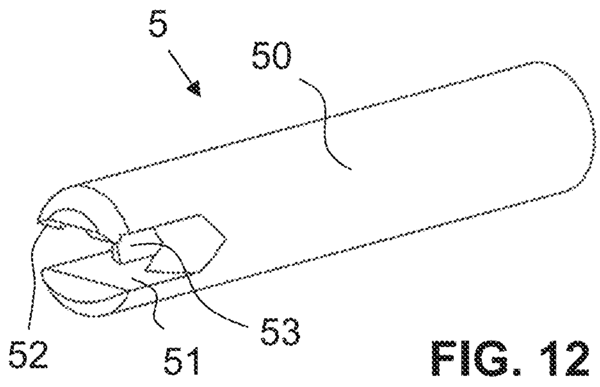
FIG. 12 shows a perspective illustration of the actuating part according to FIG. 9.
Figure 13:
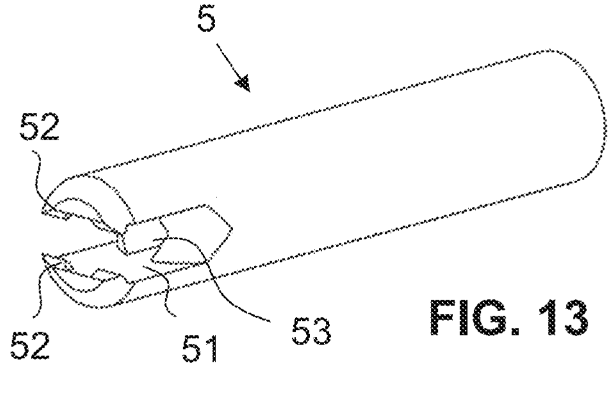
FIG. 13 shows a perspective illustration of a further embodiment of the actuating part.

FIGS. 2 to 16 illustrate a first embodiment of the seal device according to the invention, with FIG. 13 showing a variant.

Figure 2:
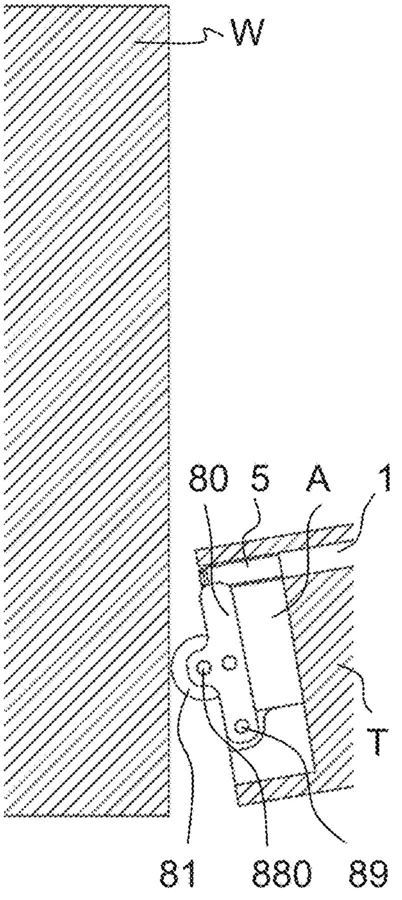
FIG. 2 shows a cross section through part of the pivot door according to FIG. 1, while the door leaf is being closed.
Figure 3:
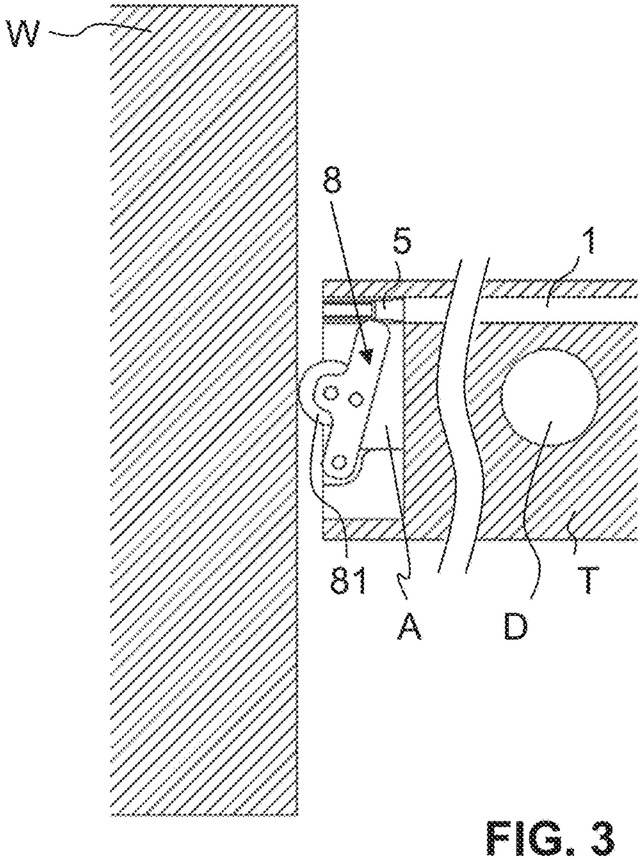
FIG. 3 shows a cross section through part of the pivot door according to FIG. 1, with the door leaf closed.

FIGS. 2 and 3 show the wall W and part of the door leaf T. In FIG. 3 the door leaf T is closed and in FIG. 2 it is in a state while the door is being closed.

Figure 4:
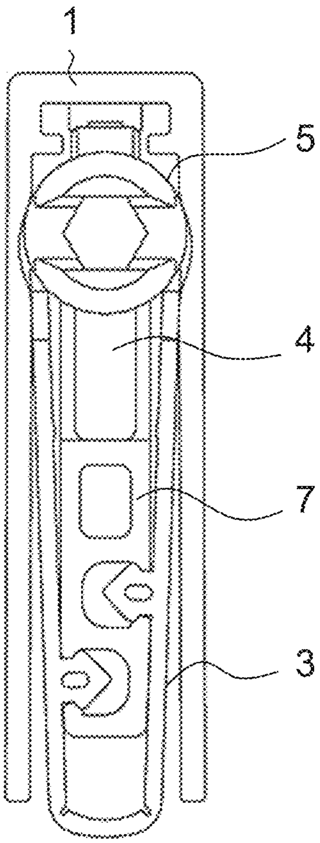
FIG. 4 shows a view of a drop-down seal of the device according to the invention.
Figure 5:
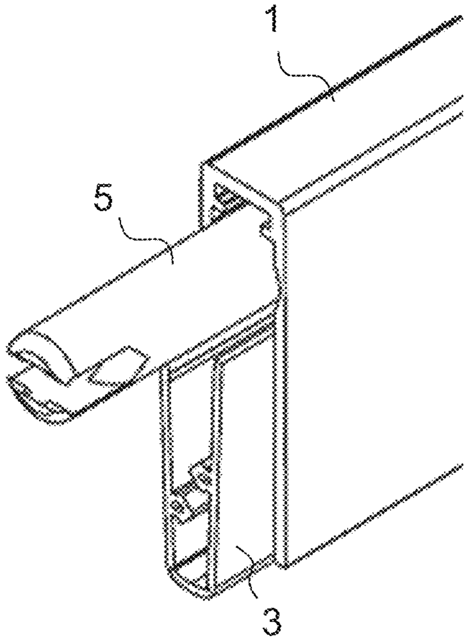
FIG. 5 shows a perspective illustration of part of the drop-down seal according to FIG. 4.
Figure 7:
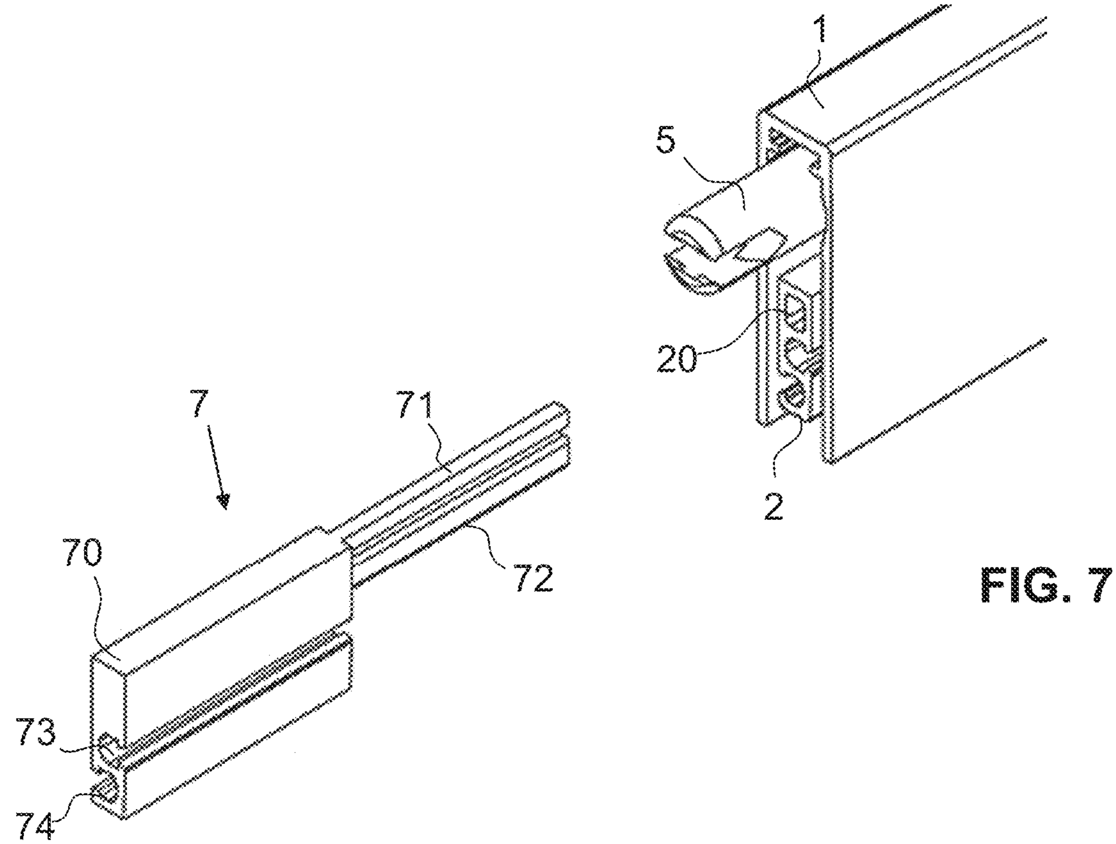
FIG. 7 shows a perspective illustration of the drop-down seal according to FIG. 4 with an adapter part, but without illustration of the sealing profile.

The seal device has a drop-down seal, which is arranged in a groove of the door leaf T. The drop-down seal is preferably a seal of the known type. The drop-down seal illustrated in FIGS. 4, 5 and 7 is preferred, but is to be understood merely as an example. It comprises a housing profile rail 1 with a U-shaped, downwardly open cross section. A sealing strip is held on or in the housing profile rail 1 and can be moved relative to the housing profile rail 1 in a direction perpendicular to the longitudinal direction of the sealing strip and thus also of the housing profile rail 1. It can thus be raised and lowered. The sealing strip is connected to the housing profile rail 1 via a lowering mechanism 4. The lowering mechanism has a different design depending on the embodiment. It preferably has leaf springs and a longitudinally extending slide. This lowering mechanism is known in the prior art. Alternative lowering mechanisms can likewise be used.

The sealing strip has a carrier profile rail 2 and a sealing profile 3 integrally formed or fastened thereon. The sealing profile 3 extends at least over the entire length, or height, of the door leaf T and rests sealingly on the floor, the ceiling or the lateral door frame when the sealing strip has been lowered. In this example, the device provides downward sealing with respect to the floor.

An actuating part 5 protrudes beyond the end face of the carrier profile rail 2 and/or the housing profile rail 1. The actuating part 5 preferably has a main body 50 in the form of a bolt or a rod. It is preferably made from plastic. As an alternative, it consists for example of metal. It acts on the lowering mechanism 4. If it is pressed in towards the housing profile rail, the lowering mechanism 4 lowers the sealing strip, preferably counter to the spring force. If the pressure on the actuating part 5 is stopped, i.e. the actuating part 5 is rereleased, the sealing strip is raised again owing to the restoring force of the springs.

Figure 8:
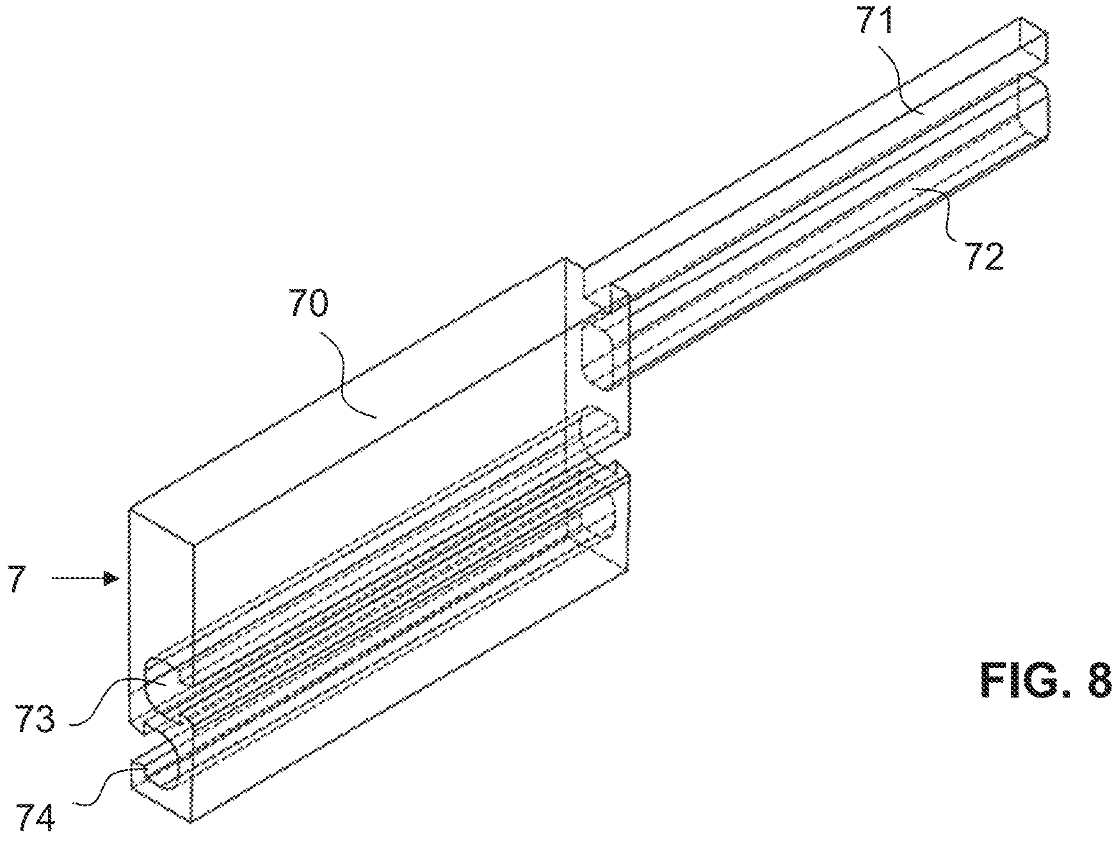
FIG. 8 shows a perspective illustration of the adapter part according to FIG. 7.

FIGS. 4, 7 and 8 illustrate an adapter part 7 which can optionally be used. It has a base body 70 with a substantially rectangular cross section and two pins 71, 72, which extend in the longitudinal direction of the base body 70 and are integrally formed on the upper part of the base body 70. The pins 71, 72 preferably have an approximately rectangular cross section.

A first one 71 of these two pins can preferably be inserted above the carrier profile rail 2, and a second one 72 of the two pins can preferably be inserted into a receiving opening 20 in the carrier profile rail 2. This can be seen in FIG. 7. As a result, the adapter part 7 forms an end-face extension of the carrier profile rail 2.

A respective receiving groove 73, 74 is formed in the two opposing side walls of the base body 70, wherein the two receiving grooves 73, 74 are arranged one above the other or next to each other depending on the embodiment. They are in line with the receiving grooves of the carrier profile rail 2 and serve, like the grooves in the carrier profile rail 2, to fasten the sealing profile 3.

If the carrier profile rail 2 has a different shape, the adapter part 7 is designed to match it.

The sealing profile 3 preferably protrudes beyond the carrier profile rail 2. Depending on the embodiment, the sealing profile 3 can be extended by "kneading out" or it is designed such that it can be expanded or extended in another way. The sealing profile 3 is preferably made of silicone or another elastomer material. It may be in one part or multiple parts, with the one-part form being preferred.

By considering FIGS. 5 and 7 together, it can be seen that the sealing profile 3 protrudes beyond the carrier profile rail 2 and the housing profile rail 1. As a result, when the adapter part 7 has been inserted, the sealing profile also extends over the entire length of the adapter part. It also preferably protrudes beyond the end side of the adapter part 7, with the result that it sealingly abuts the vertical door frame, or the case, when the door leaf is closed. That is to say, it forms an end-side seal.

The seal device also has a triggering module 8, as can be seen in FIGS. 2 and 3. The triggering module 8 is arranged in a recess A in the door leaf T. The recess A is preferably located on the end side next to the groove that receives the housing profile rail 1.

Figure 6:
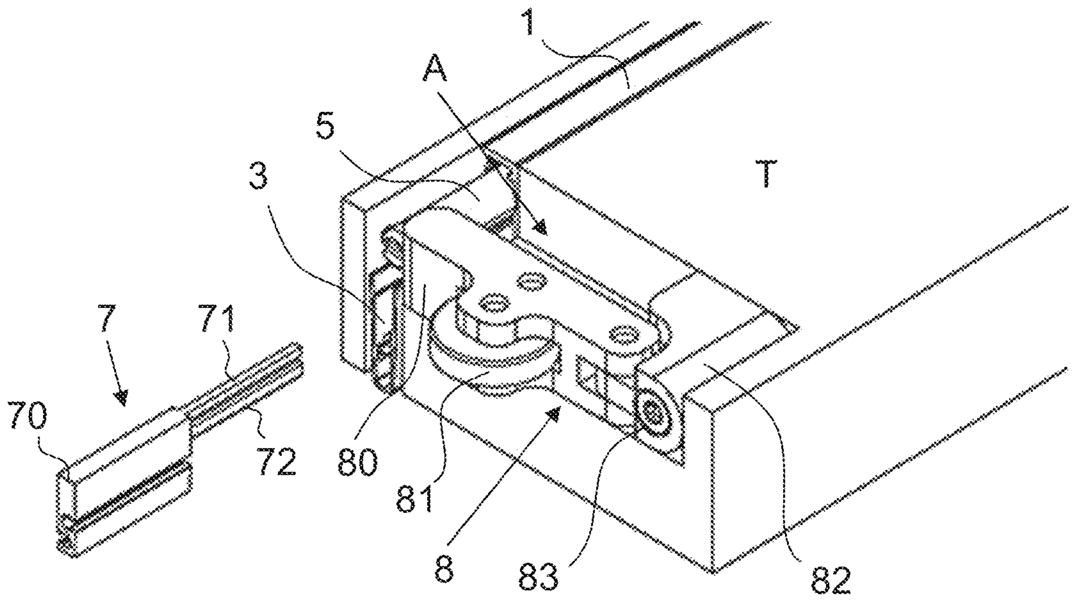
FIG. 6 shows a perspective illustration of the seal device according to the invention mounted in the door leaf.
Figure 9:
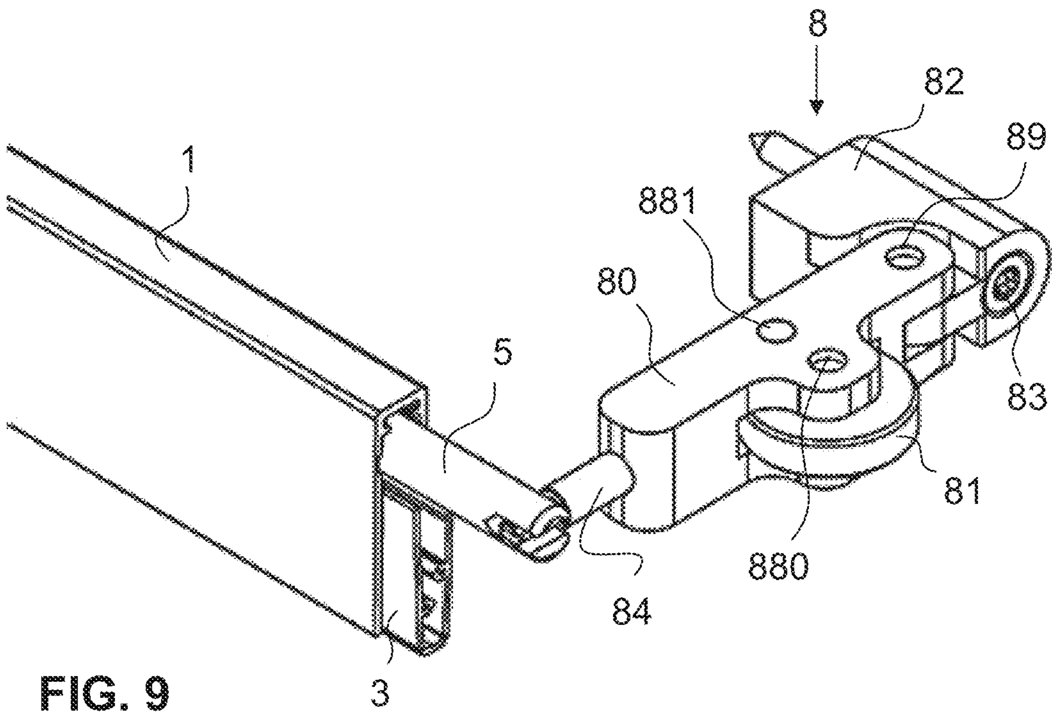
FIG. 9 shows a perspective illustration of part of the seal device according to the invention.
Figure 10:
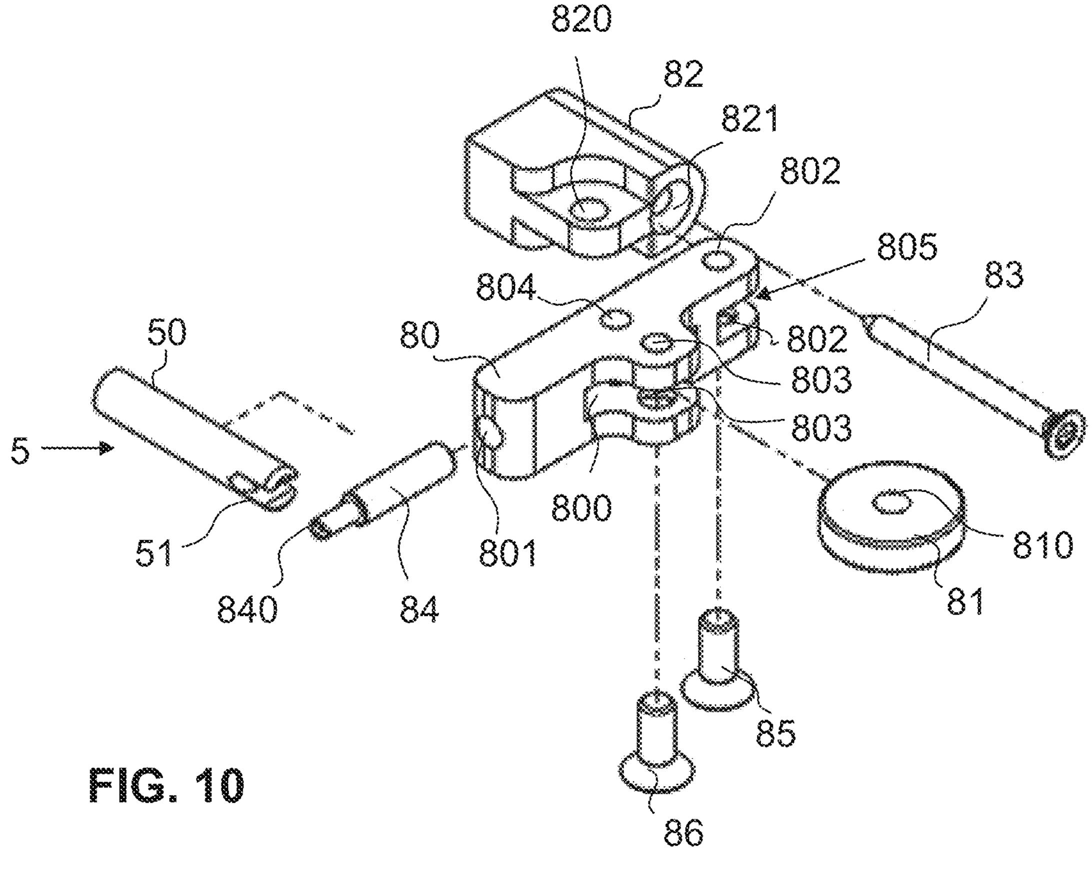
FIG. 10 shows an exploded illustration of a triggering module of the device according to the invention and an actuating part of the drop-down seal according to FIG. 4.

The triggering module 8 can be clearly seen in FIGS. 6, 9 and 10. It has a pivot arm 80. A receiving opening 801 is present on an end face of a first end of the pivot arm 80. A fork-shaped first recess 805, which is delimited by two first through-openings 802 that are in line with one another, is present at the opposite, second end of the pivot arm 80. A fork-shaped second recess 800, which is delimited by two second through-openings 803 that are in line with one another and two third through-openings 804 that are in line with one another, is present between the first and the second end.

The triggering module 8 also comprises a first fixing part 82 with a fastening opening 821. The first fixing part 82 can be fastened in the recess A of the door leaf T by means of a first screw 83.

The first fixing part 82 also has a plate with a fourth through-opening 820. The plate can be inserted into the fork-shaped first recess 805 and fixed by means of a bolt or a second screw 85, with the result that the pivot arm is fastened in the recess A of the door leaf T pivotably relative to the first fixing part 82.

A wheel 81 is rotatably fastened in the second recess 800 of the pivot arm 80. For this, it has a central through-opening 810 through which a third screw 86 passes. The wheel 81 is thus rotatably fixed. To this end, the third screw 86 is screwed either in the second through-openings 803 or in the third through-openings 804.

A connecting pin 84 is arranged in the receiving opening 801. At its free end 840, the connecting pin 84 has coupling means for connection to the actuating part 5. The coupling means is preferably a snap-fit element for snap-fitting into a slot 51 of the actuating part 5. The snap-fit element is, for example, a resilient fork.

The slot 51 is preferably integrally formed on the free end of the main body 50. It is delimited towards the free end preferably by means of inwardly projecting lugs 52. Depending on the embodiment, lugs 52 are present only on one side of the slot 51, as illustrated in FIG. 12, or lugs 52 are present on either side.

As can be seen in FIGS. 12 and 13, a bore 53 which is accessible through the slot 51 from the outside is present in the main body 50.

Figure 11:
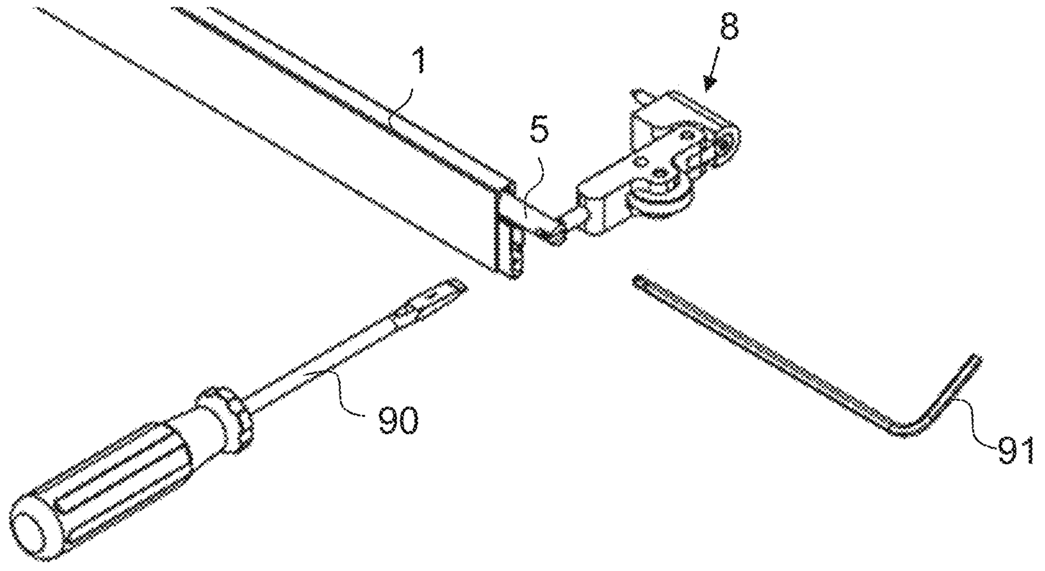
FIG. 11 shows the seal device according to FIG. 9 with a tool for adjusting individual components.

FIG. 11 illustrates that the position of both the actuating part 5, i.e. the bolt, and the connecting pin 84 can be changed. For example, the connecting pin 84 can be screwed into the pivot arm 80 to a greater or lesser extent by means of a screwdriver 90. The actuating part 5 can, for example, be screwed into the housing rail 1 to a greater or lesser extent by means of an Allen key 91. By changing the extent to which the actuating part 5 protrudes, the travel of the sealing strip can be changed. Changing the extent to which the connecting pin 84 protrudes enables connection to the actuating part 5 irrespective of its set position.

In FIGS. 2 and 3, it can now be seen that the wheel 81 rolls on the door frame, or the case, when the door leaf T is being closed and the pivot arm 80 moves into the recess A in the door leaf T. In the process, the pivot arm 80 pushes the actuating part 5 into the drop-down seal by virtue of the connection. The lowering mechanism is actuated and the sealing strip, i.e. the carrier profile rail 2 and the sealing profile 3, and the adapter part 7 are lowered. When the door is being opened, the opposite movements take place, since the sealing strip is raised owing to the restoring force of the springs and the actuating part 5 is pushed outwards.

Figure 14:
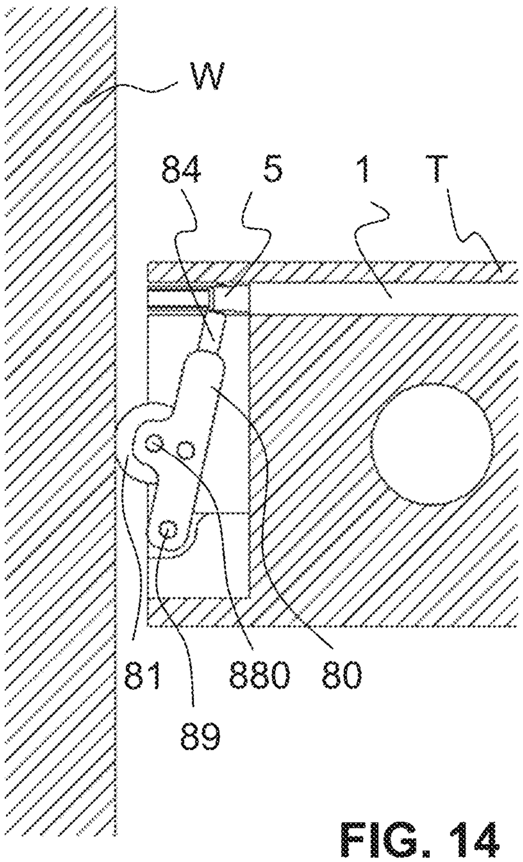
FIG. 14 shows a cross section through part of the pivot door according to FIG. 1, with the door leaf closed, in a second setting of the triggering module.

In FIGS. 2 and 3, the connecting pin 84 is screwed into the pivot arm 80 to a relatively great extent; in FIG. 14, it protrudes further.

In FIGS. 2, 3 and 14, the wheel 81 is fastened in the second through-openings 803 and thus pivots about a first pivot axis 880. The pivot axis 89 of the pivot arm 80 is defined by the first through-openings 802.

Figure 15:
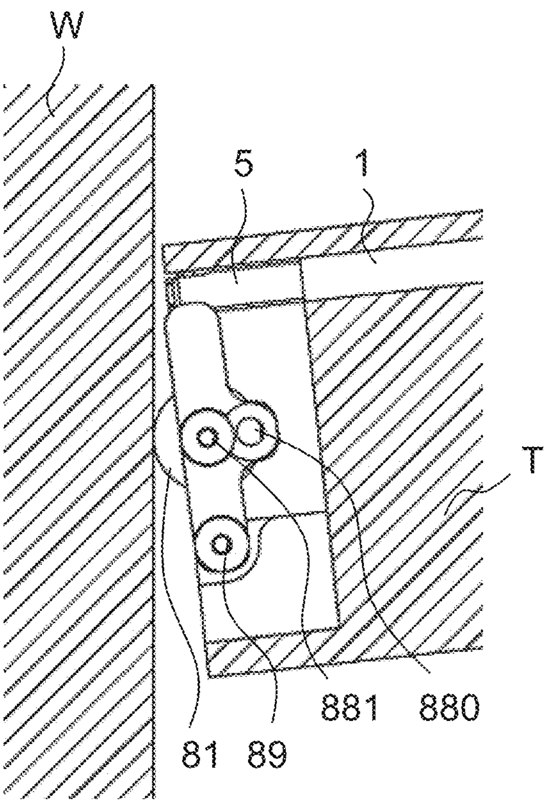
FIG. 15 shows a cross section through part of the pivot door according to FIG. 1, while the door leaf is being closed, in a third setting of the triggering module.
Figure 16:
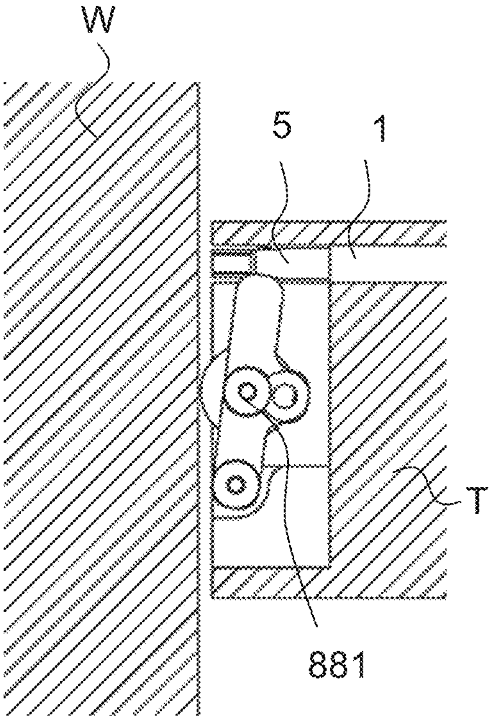
FIG. 16 shows a cross section through part of the pivot door according to FIG. 15, with the door leaf closed, in the third setting of the triggering module.

In FIGS. 15 and 16, the pivot arm is rotated about its longitudinal axis by 180°. Now, it is not the second through-openings 803 but the third through-openings 804 which are closer to the door frame. The third screw 86 passes through the third through-openings 804 for the purpose of fastening the wheel 81, with the result that the wheel 81 rotates about a second axis of rotation 881.

The choice of the position of the wheel 81 in relation to the pivot axis 89 thus enables further adaptation to the local conditions. This enables optimum actuation of the drop-down seal and protects the door frame.

In the exemplary embodiment described, the housing profile rail 1 is preferably arranged recessed in the door leaf T. The actuating part 5 preferably does not protrude beyond the door leaf. Except for the wheel 81, preferably no components protrude beyond the lateral end face of the door leaf T, or they only minimally protrude beyond the end face. The drop-down seal is also fastened in the door leaf T independently of the triggering module 8.

Figure 17:
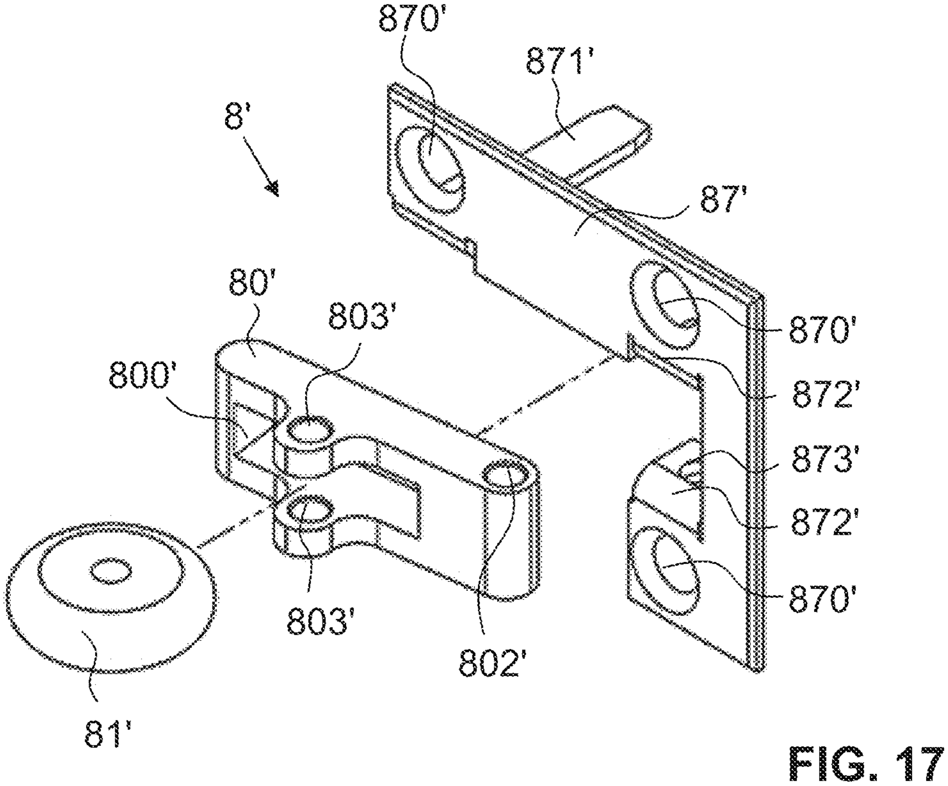
FIG. 17 shows an exploded illustration of the triggering module according to the invention in a second embodiment.

In the embodiment according to FIG. 17, the triggering module 8' moreover serves to fasten the drop-down seal, preferably the housing profile rail 1, in the door leaf T. To this end, the triggering module 8' instead of the first fixing part 82' has a second fixing part 87', which fastens both the pivot arm 80' in the door leaf T and the housing profile rail 1 in the door leaf T. A first tab 871', which can be pushed into the U-shaped housing profile rail 1 below a fin of the latter and thus holds the drop-down seal, is preferably present.

The second fixing part 87' is preferably in the form of a plate with fastening openings 870 for screwing onto the end face or into the recess A of the door leaf T. The first tab 871' and two second tabs 872' are integrally formed on this plate 87'. The second tabs 872' are arranged parallel to and spaced apart from one another and they each have a through-opening 873', which are in line with one another, for receiving the second screw 85, in order to pivotably hold the pivot arm 80. A connecting pin, which is, however, not illustrated in FIG. 17, is preferably also present in this embodiment. In this embodiment, the pivot arm 80' can be connected to the second fixing part 87' only in one position. In other embodiments, however, the pivot arm 80' has the same design as in the first exemplary embodiment, such that the wheel 81' can be used in two different positions with respect to the pivot axis 89.

Figure 18:
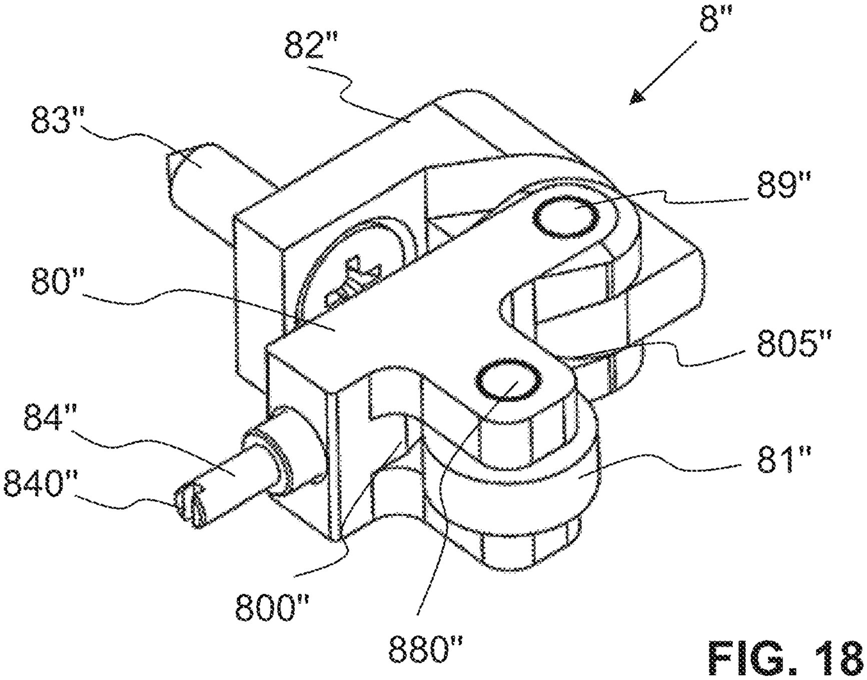
FIG. 18 shows a perspective illustration of an inventive triggering module according to a third embodiment and FIG. 19 shows a further perspective illustration of the triggering module according to FIG. 18.
Figure 19:
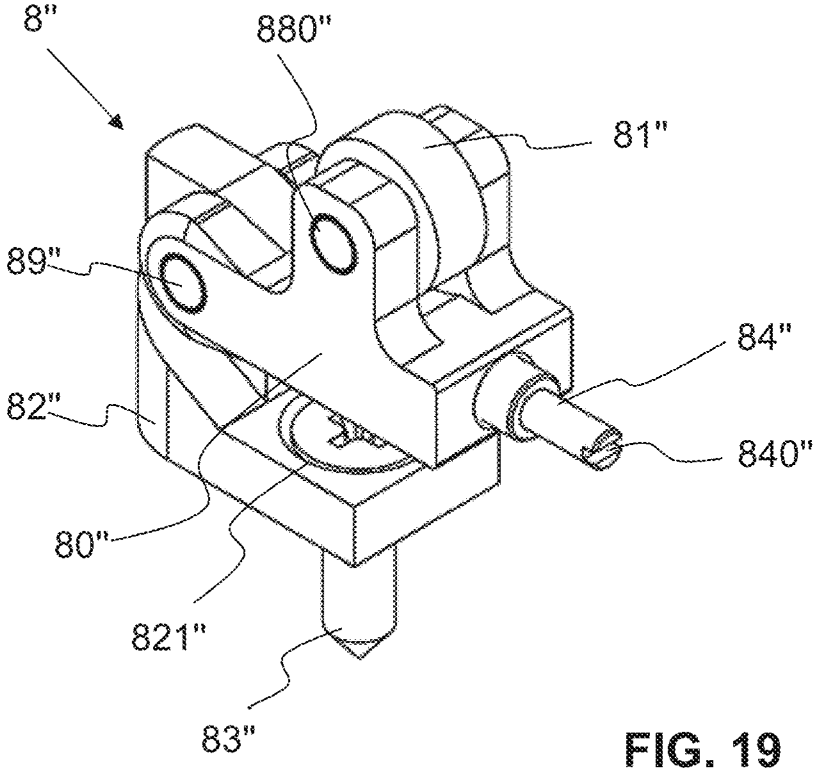

The triggering module in the embodiment shown in FIGS. 18 and 19 is designed to save space thanks to the angular shape of the first fixing part 82". It is particularly suitable for narrow door leaves.

The triggering module corresponds in essential parts to the first embodiment example described above. The description of the first embodiment example therefore also applies to this triggering module, unless otherwise described below.

The triggering module according to this third embodiment has the pivot arm 80", the roller or wheel 81" and the first fixing part 82". The pivot arm 80" has a beam, which is preferably shorter than in the first embodiment. The connecting pin 84" with the slotted free end 840" is arranged at one end face end of the beam. Preferably, it is screwed in. As in the examples already described, the connecting pin 84" serves to connect to the actuating part 5 of the drop-down seal.

The opposite end of the beam has the recess 805" for receiving the first fixing part 82". The pivot arm 80" is pivotable about the pivot axis 89" relative to the first fixing part 82.

A receptacle for the wheel 81 is arranged in the beam of the pivot arm 80", preferably the receptacle 800", as already described in the examples mentioned above. Preferably, the receptacle is formed on a side wall of the beam of the pivot arm 80" in the form of a protruding lug. The wheel 81" is rotatable about the first axis of rotation 880". Instead of a lug, other designs of the pivot arm can also be formed as a receptacle for the wheel 81".

The first fixing part 82" is an angled element with two legs. The angle between them is preferably 90°. The first leg has the fourth through-opening 820" and can be arranged in the recess 805" and pivotably fixed. The fourth through-opening is not visible in FIGS. 18 and 19. The second leg has the fastening opening 821" for receiving the first screw 83".

The first fixing part 82" extends parallel or approximately parallel to the pivot arm 80". It is screwed to a front end face of the door leaf by means of the first screw 83". The type of assembly is shown in FIG. 6.

In the applications illustrated in the figures, the wheel 81" rolls on the door case, or on the door frame. As an alternative, a run-up ramp, an outwardly or inwardly curved surface, or a differently designed contact surface, which is made to interact with the wheel 81" and thus with the triggering module 8" when the door leaf T is being closed, may be attached to the door case or the door frame.

The seal device according to the invention enables optimum use in pivoting doors.

The invention claimed is:

1. A seal device for a door with a pivotable door leaf, wherein the seal device comprises a drop-down seal for arrangement on or in the door leaf, wherein the drop-down seal has a housing profile rail, a sealing strip which can be raised and lowered relative to the housing profile rail, a lowering mechanism for raising and lowering the sealing strip, and an actuating part, wherein the actuating part actuates the lowering mechanism when the door leaf is being closed, and wherein the seal device comprises a triggering module with a wheel, wherein the triggering module acts on the actuating part when the door leaf is being closed, wherein the triggering module is designed for arrangement on or in the door leaf and/or is arranged fixedly on the housing profile rail, wherein the triggering module has a pivot arm, which at a first end is operatively connected to the actuating part and at a second end is designed for fastening on or in the door leaf and/or is arranged fixedly on the housing profile rail, wherein the wheel is arranged in or on the pivot arm and is designed to bear against a fixed stop surface of the door, wherein the pivot arm is pivotable about a pivot axis and the wheel is rotatable about an axis of rotation, wherein the pivot axis and the axis of rotation extend parallel to, but spaced apart from, one another, and wherein the pivot axis and the axis of rotation extend perpendicularly in relation to the longitudinal direction of the sealing strip and parallel to the direction in which the sealing strip is lowered.

2. The seal device according to claim 1, wherein the first end of the pivot arm is or can be detachably connected to the actuating part.

3. The seal device according to claim 1, wherein the actuating part is a rod or a bolt, which extends in the longitudinal direction of the sealing strip.

4. The seal device according to claim 1, wherein the triggering module is arranged laterally in relation to the sealing strip.

5. The seal device according to claim 1, wherein the position of an axis of rotation of the wheel in relation to the second end of the pivot arm can be adjusted.

6. The seal device according to claim 1, wherein the wheel is arranged interchangeably in the pivot arm.

7. The seal device according to claim 1, wherein the position of the actuating part with respect to the lowering mechanism can be adjusted.

8. The seal device according to claim 1, wherein the seal device comprises an adapter part which can be connected to the sealing strip to extend the sealing strip.

9. The seal device according to claim 1, wherein the pivot arm is pivotably fastened to a fixing part and wherein the fixing part can be positionally fixedly fastened on or in the door leaf or on the housing profile rail.

10. The seal device according to claim 9, wherein the fixing part has a tab for fixing the housing rail on the door leaf.

11. A door leaf having a seal device according to claim 1, wherein the door leaf has an end-side recess, in which the triggering module is arranged.

12. The seal device according to claim 1, wherein a connecting pin can be screwed into the pivot arm to a greater or lesser extent, wherein the connecting pin has coupling means for connection to the actuating part.

13. A triggering module of a seal device for a door with a pivotable door leaf, wherein the seal device comprises a drop-down seal for arrangement on or in the door leaf, wherein the drop-down seal has a housing profile rail, a sealing strip which can be raised and lowered relative to the housing profile rail, a lowering mechanism for raising and lowering the sealing strip, and an actuating part being a rod or a bolt, wherein the actuating part actuates the lowering mechanism when the door leaf is being closed, wherein the triggering module comprises a wheel, wherein the triggering module acts on the actuating part of the seal device when the door leaf is being closed, wherein the triggering module is designed for arrangement on or in the door leaf, wherein the triggering module has a pivot arm, which at a first end is operatively connected to the actuating part and at a second end is designed for fastening on or in the door leaf and/or is arranged fixedly on the housing profile rail, wherein the wheel is arranged in or on the pivot arm and is designed to bear against a fixed stop surface of the door, wherein the pivot arm is pivotable about a pivot axis and the wheel is rotatable about an axis of rotation, wherein the pivot axis and the axis of rotation extend parallel to, but spaced apart from, one another, and wherein the pivot axis and the axis of rotation extend perpendicularly in relation to the longitudinal direction of the sealing strip and parallel to the direction in which the sealing strip is lowered.

* * * * *